US012730755B2

(12) United States Patent
Shyvers et al.

(10) Patent No.: US 12,730,755 B2
(45) Date of Patent: Sep. 8, 2026

(54) BLOOM-BASED HIT PREDICTOR

(71) Applicant: Advanced Micro Devices, Inc., Santa Clara, CA (US)

(72) Inventors: Patrick J. Shyvers, Ft. Collins, CO (US); William L Walker, Ft. Collins, CO (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 18/364,041

(22) Filed: Aug. 2, 2023

(65) Prior Publication Data

US 2025/0045206 A1 Feb. 6, 2025

(51) Int. Cl.
*G06F 12/0871* (2016.01)
*G06F 12/0864* (2016.01)

(52) U.S. Cl.
CPC ...... *G06F 12/0871* (2013.01); *G06F 12/0864* (2013.01); *G06F 2212/1021* (2013.01)

(58) Field of Classification Search
CPC ............ G06F 12/0871; G06F 12/0864; G06F 2212/1021; G06F 12/0859; G06F 9/3861; G06F 9/3832; G06F 9/3842; G06F 9/383; G06F 2212/1016; G06F 2212/502; G06F 2212/507
See application file for complete search history.

(56) References Cited

U.S. PATENT DOCUMENTS 5,450,565 A * 9/1995 Nadir .................. G06F 12/0864 711/134
9,552,294 B2 1/2017 Sim et al.
11,907,130 B1 * 2/2024 Hornung ............... G06F 9/3834
2003/0208665 A1 * 11/2003 Peir ..................... G06F 12/0859 712/E9.05
2009/0222625 A1 * 9/2009 Ghosh ................. G06F 12/0802 711/3
2014/0013027 A1 * 1/2014 Jannyavula Venkata .................... G06F 12/0866 711/E12.024
2018/0213053 A1 * 7/2018 Yeager .................. H04L 67/568
2018/0349280 A1 * 12/2018 Prasad .................. G06F 12/128
2022/0067142 A1 * 3/2022 Favor .................. G06F 12/1408
2024/0061780 A1 * 2/2024 Duan .................. G06F 12/0842

* cited by examiner

*Primary Examiner* — Edward J Dudek, Jr.
(74) *Attorney, Agent, or Firm* — Slater Matsil, LLP

(57) ABSTRACT

An implementation is a method for operating a cache memory in a computing system, receiving a request for a first data item from the cache memory of the computing system, the first data item having an associated tag value. The method also includes performing a lookup in a bloom filter for the tag value associated with the first data item. The method also includes performing a lookup in the cache memory for the requested first data item based on the lookup in the bloom filter. The method also includes updating the bloom filter based on results of the lookup in the cache memory for the requested first data item.

20 Claims, 6 Drawing Sheets

BLOOM-BASED HIT PREDICTOR

TECHNICAL FIELD

The present invention generally relates to the field of computing systems, and more specifically, to methods and systems for predicting hits in a cache memory of such computing systems.

BACKGROUND

Cache memories are commonly employed in computing systems to store frequently accessed data, thereby enhancing the speed of data access and overall system performance. The operation of a cache involves checking for the presence of a requested data item in the cache (a cache 'hit') or its absence (a cache 'miss'). A high cache hit rate signifies improved performance, as it reduces the time-consuming operations of accessing slower main memory or even slower disk storage.

In traditional systems, cache hit or miss determination is done reactively—the system merely determines whether a cache hit or miss has occurred after the data request is processed. However, such an approach may not be efficient in all circumstances, particularly in modern high-speed computing environments, where the time taken to decide whether a cache hit or miss has occurred can be a significant contributor to latency.

BRIEF DESCRIPTION OF THE DRAWINGS

For a more complete understanding of the present invention, and the advantages thereof, reference is now made to the following descriptions taken in conjunction with the accompanying drawings, in which.

Figure 1:
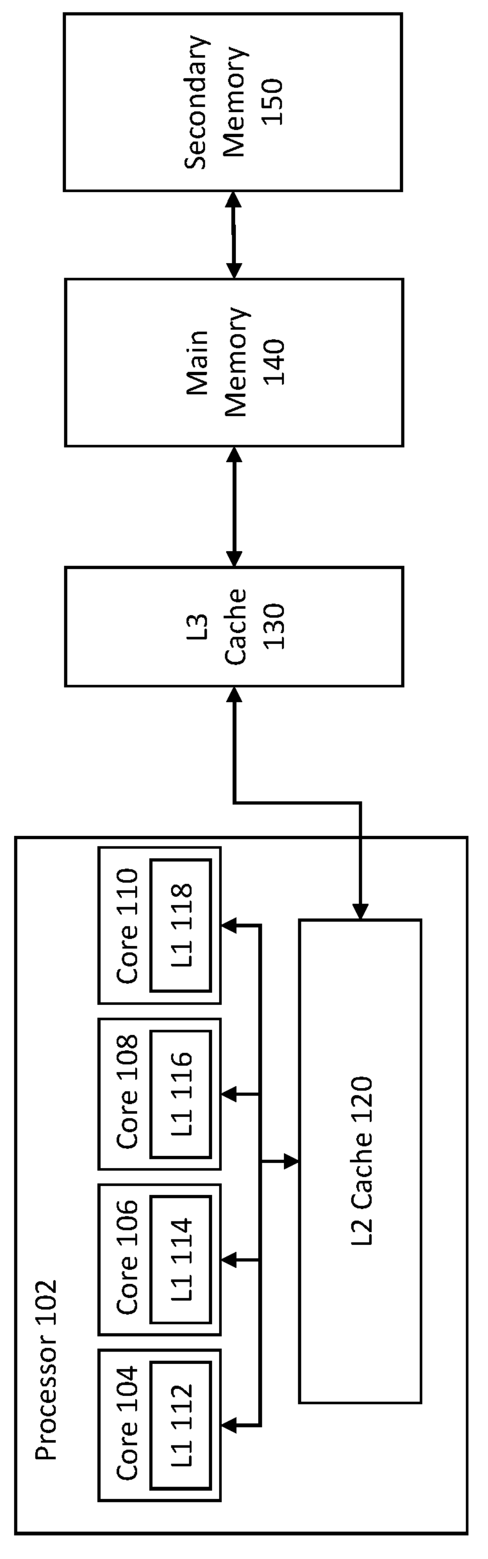
FIG. 1 is a block diagram of a computing system in accordance with some implementations.

Corresponding numerals and symbols in the different figures generally refer to corresponding parts unless otherwise indicated. The figures are drawn to clearly illustrate the relevant aspects of the implementations and are not necessarily drawn to scale. The edges of features drawn in the figures do not necessarily indicate the termination of the extent of the feature.

DETAILED DESCRIPTION OF ILLUSTRATIVE IMPLEMENTATIONS

The making and using of various implementations are discussed in detail below. It should be appreciated, however, that the various implementations described herein are applicable in a wide variety of specific contexts. The specific implementations discussed are merely illustrative of specific ways to make and use various implementations, and should not be construed in a limited scope.

Reference to "an implementation," "one implementation," "an embodiment," or "one embodiment" in the framework of the present description is intended to indicate that a particular configuration, structure, or characteristic described in relation to the implementation/embodiment is included in at least one implementation/embodiment. Hence, phrases such as "in one implementation" or "in one embodiment" that may be present in one or more points of the present description do not necessarily refer to one and the same implementation/embodiment. Moreover, particular conformations, structures, or characteristics may be combined in any adequate way in one or more implementations/embodiments. The references used herein are provided merely for convenience and hence do not define the extent of protection or the scope of the implementations/embodiments.

The traditional reactive cache hit or miss determination can be a significant contributor to latency. One solution to this problem has been the development of cache hit prediction techniques, which aim to proactively predict whether a cache hit or miss will occur for a given data request. This proactive prediction can then be used to streamline the processing of data requests and reduce latency. Existing cache hit prediction solutions include an analysis of past access patterns, machine learning algorithms, and statistical models. However, these solutions often fall short in terms of prediction accuracy, particularly in systems with complex data access patterns or fluctuating data access behavior. Furthermore, these cache hit predictors are typically large and expensive, requiring considerable computational resources for both deployment and training. This high resource requirement poses a significant challenge, especially in ensuring good accuracy. Consequently, there is a need for more efficient, cost-effective, and accurate cache hit prediction methods and systems.

In accordance with some implementations, an inexpensive and accurate hit prediction system and method are provided for memory structures. In particular, the system and method include a hit prediction mechanism that enables fast operation and low overhead while maintaining high prediction accuracy. The hit prediction mechanism is a modified Bloom filter that is configured to be updated. The modified Bloom filter implementation disclosed herein allows for updating of the Bloom filter such that the Bloom filter stays up-to-date with the information stored in the memory structure. Thus, the hit prediction mechanism disclosed herein is able to maintain its accuracy over time during the adding and removing of items from the memory structure, while also maintaining fast lookup speed and low area overhead.

FIG. 1 presents a block diagram illustrating a computing system 100 in accordance with some implementations. In some implementations, the computing system 100 includes a processor 102, a level-three (L3) cache 130, a main memory 140, and a secondary memory 150. The processor 102 is generally a device that performs computational operations in the computing system 100. In some implementations, the processor 102 includes four processor cores 104, 106, 108, and 110, each of which includes a computational mechanism such as a central processing unit (CPU), a graphics processing unit (GPU), and/or an embedded processor.

The processor 102 also includes cache memories (or "caches") used for storing instructions and data that are used by processor cores 104-110 for performing computational operations. As can be seen in FIG. 1, the caches in processor 102 include a level-one (L1) cache 112, 114, 116, and 118 in each processor core 104-110 that is used for storing instructions and data for use by the processor core. Generally, the L1 caches 112-1118 are the smallest of a set of caches in the computing system 100 and are located closest to the circuits (e.g., execution units, instruction fetch units, etc.) in the processor cores 104-110 that use the instructions and data that are stored in the L1 caches 112-118. The closeness of the L1 caches 112-118 to the corresponding circuits enables the fastest access to the instructions and data stored in the L1 caches 112-118 from among the caches in computing system 100.

The processor 102 also includes a level-two (L2) cache 120 that is shared by processor cores 104-110 and hence is used for storing instructions and data for all of the sharing processor cores 104-110. Generally, the L2 cache 120 is larger than the L1 caches 112-118 and is located outside, but close to, the processor cores 104-110 on the same semiconductor die as the processor cores 104-110. Because the L2 cache 120 is located outside the processor cores 104-110 but on the same die, access to the instructions and data stored in the L2 cache 120 is slower than accesses to the L1 caches, but faster than accesses to the L3 cache 130 in the computing system 100.

The largest of the caches in computing system 100, the level-three (L3) cache 130 is shared by the processor cores 104-110 and hence is used for storing instructions and data for all of the processor cores. In some implementations, the L3 cache 130 is located external to the processor 102 (e.g., on a different die or dies than processor 102). Accordingly, accessing data and instructions in the L3 cache 130 is typically slower than accessing data and instructions in the L1 caches 112-118 and the L2 cache 120.

In some implementations, each of the L1 caches 112-118, the L2 cache 120, and the L3 cache 130 (may be referred to collectively as "the caches") include memory circuits that are used for storing cached data and instructions. For example, the caches may include one or more of static random-access memory (SRAM), embedded dynamic random access memory (eDRAM), DRAM, double data rate synchronous DRAM (DDR SDRAM), and/or other types of memory circuits.

The main memory 140 comprises memory circuits that form a main memory of computing system 100. The main memory 140 is used for storing instructions and data for use by the processor cores 104-110 on the processor 102. In some implementations, the main memory 140 is fabricated from memory circuits such as one or more of DRAM, SRAM, DDR SDRAM, and/or other types of memory circuits.

The computing system 100 also includes the secondary memory 150. The secondary memory 150 may include one or more mass storage devices, such as a hard disk drive, a RAID array, large semiconductor memories, a removable storage drive, an optical disk drive, the like, or a combination thereof.

Taken together, the L1 caches 112-118, the L2 cache 120, the L3 cache 130, the main memory 140, and the secondary memory 150 form a memory hierarchy of the computing system 100. Within computing system 100, memory requests are preferentially handled in the level of the memory hierarchy that results in the fastest and/or most efficient operation of computing system 100.

Figure 2:
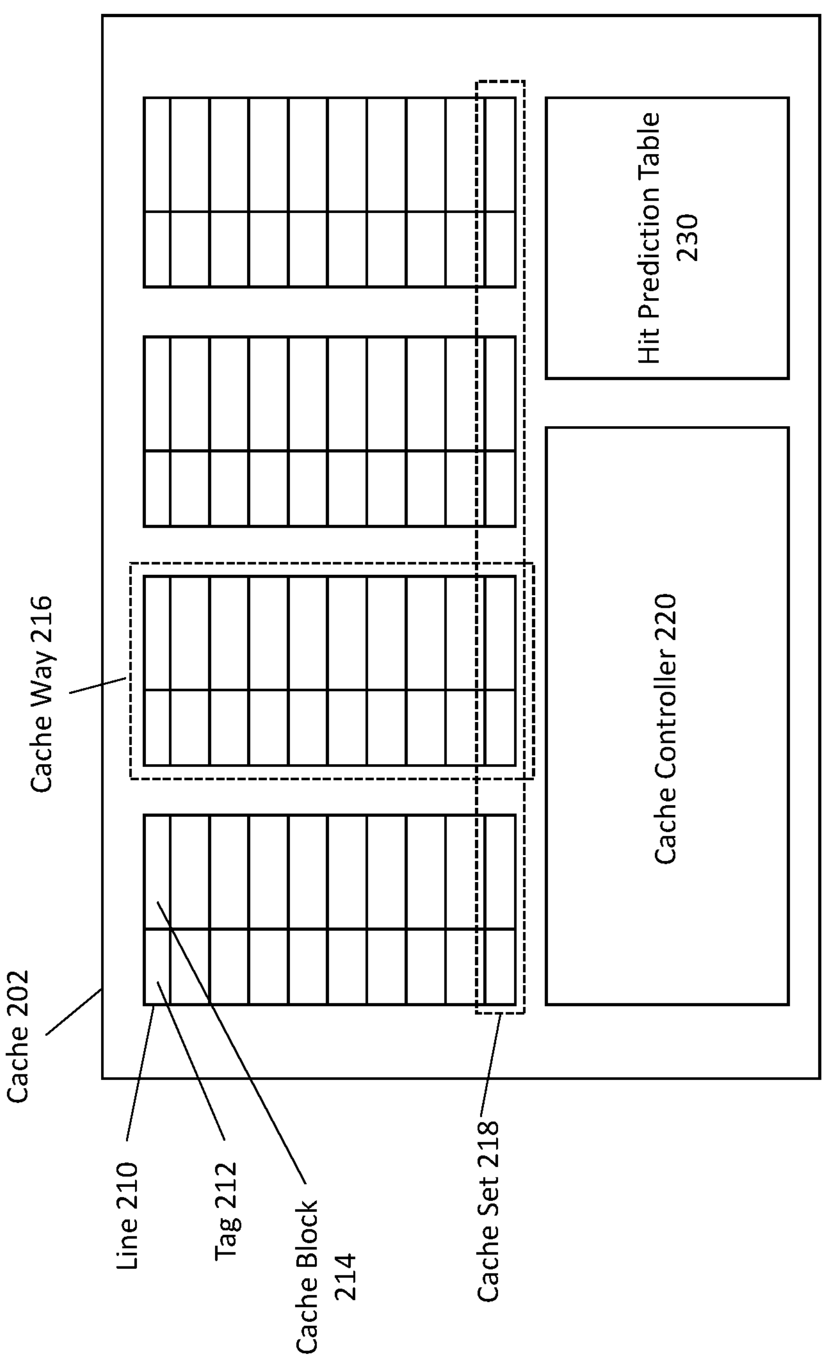
FIG. 2 is a block diagram of a cache apparatus in accordance with some implementations.

In some implementations, one or more of the cache memories, such as the L2 cache 120 can include a hit prediction table 230 (see, e.g., FIG. 2). A cache controller (see, e.g., FIG. 2) in the L2 cache 120 can use the hit prediction table 230 for hit prediction of the L2 cache 120 and also update the hit prediction table 230. For example, when the cache controller of the L2 cache 120 accesses a set of data in the L2 cache 120 in its normal course of operation (e.g., during a read of data from the cache), it can update the hit prediction table 230 based on the accessed set of data to keep the data in the hit prediction table 230 from becoming out of data like typical Bloom filter implementations.

Although implementations are described with a particular arrangement of processor cores, some implementations include a different number and/or arrangement of processor cores. For example, some implementations have only one processor core (in which case the caches are used by the single processor core), while other implementations have two, five, eight, or another number of processor cores—with the memory hierarchy adjusted accordingly. Generally, the described implementations can use any arrangement of processor cores that can perform the operations herein described.

Additionally, although implementations are described with a particular arrangement of caches, some implementations include a different number and/or arrangement of caches. For example, in some implementations, some or all of the caches (e.g., L1 caches 112-118, etc.) are divided into separate instruction and data caches. Additionally, the L2 cache 120 and/or the L3 cache 130 may not be shared in the same way as shown, and hence may only be used by a single processor core, two processor cores, etc. (and hence there may be multiple L2 caches 120 and/or L3 caches 130 in the processor 102). As another example, some implementations include different levels of caches, from only one level of cache to multiple levels of caches, and these caches can be located in the processor 102 and/or external to the processor 102. For example, in some implementations, the L3 cache 130 is located on the same die as the processor 102. Generally, the described implementations can use any arrangement of caches that can perform the operations herein described.

Moreover, although computing system 100 and processor 102 are simplified for illustrative purposes, in some implementations, computing system 100 and/or processor 102 include additional mechanisms for performing the operations herein described and other operations. For example, computing system 100 and/or processor 102 can include power controllers, batteries, media processors, input-output mechanisms, communication mechanisms, networking mechanisms, display mechanisms, etc.

FIG. 2 is a block diagram of a cache 202 in accordance with some implementations. The cache 202 is a general example of an internal configuration that may be implemented in any of the caches in the described implementations. For example, some or all of the L1 caches 111-118, the L2 cache 120, and the L3 cache 130 can have, but are not required to have, internal configurations similar to the cache 202.

The cache 202 includes a cache controller 220. The cache controller 220 is a functional block that performs various functions for controlling operations in cache 202. For example, cache controller 220 can manage writing/storing cache blocks to, invalidating cache blocks in, and evicting cache blocks from cache 202; can perform lookups for cache blocks in cache 202; can handle coherency operations for cache 202; and/or can respond to requests for cache blocks from cache 202.

The cache 202 stores items in memory circuits. The memory circuits may include one or more of SRAM, eDRAM, DRAM, DDR SDRAM, and/or other types of memory circuits that are divided into a set of lines with each line configured to store a cache block and a tag. The line can also include other information about the cache block (indicators, flags, set index, etc.). In FIG. 2, a cache block 214 and a corresponding tag 212 are labeled for a line 210 in the cache 202. The tag 212 holds the address information of the data stored in the cache block 214, which stores the actual data from memory. The tag 212 assists the cache controller 220 in identifying if the requested data is contained within a cache line 210 of the set 218. Note that, although shown in a same line 210 in cache 202, in some implementations, the tag 212 and the cache block 214 for each line 210 are stored in two physically separate tables/arrays/memory circuits (e.g., a tag array and a cache block array).

The memory in the caches in computing system 100 is limited (e.g., to 96 KB for the L1 caches 112-118, 2048 KB for the L2 cache 120, etc.), and so every cache block that may be loaded from main memory 140 cannot be simultaneously stored in a given cache. Instead, locations in the caches are shared, and therefore made available for storing cache blocks from various addresses in main memory 140. In the described implementations, any of a number of operations/policies can be used for managing the storage of cache blocks in the limited memory in the caches. For example, some implementations use set associativity for managing the storage of cache blocks. For set associativity, the memory in the cache is divided into a number of sets, and the sets are further divided into a number of ways. In the example configuration of FIG. 2, the cache 202 includes four ways 216. In an example implementation where the memory in the cache 202 is 1024 KB in size and 1 KB cache blocks are to be stored in the cache 202, each way has storage for 256 cache blocks, and hence each way includes 256 sets. Each of the sets 218 has a line 210 in each way 216 in the cache 202. Each set 218 can be used to store cache blocks 214 from a range of memory addresses, and hence the corresponding line 210 in each way 216 for the set 218 can be used to store cache blocks 214 from the range of memory addresses.

During operation, the processor cores 104-110 will request data from the memory of the computing system 100. When a processor core (or a higher level in the memory hierarchy) is able to retrieve data from the cache 202 that corresponds to a specific memory address requested—that is a cache hit. Conversely, a cache miss occurs when the processor core (or higher level in the memory hierarchy) fails to locate the requested data in the cache 202. In this case, the processor core must retrieve the data from a lower level of the cache, the main memory 140 or, in some instances, from the secondary memory 150.

The hit prediction table 230 is a functional block that is configured to function as an updateable Bloom filter and provide hit prediction for the cache 202. Specifically, the hit prediction table 230 is a Bloom filter used to predict whether a requested data item is likely to be in the cache 202 without having to access the cache 202 itself. In some implementations, there is one Bloom filter (e.g., one table) of the hit prediction table 230 for the entire cache 202 with the Bloom filter table having the same number of indices as the cache 202. For example, if the cache 202 has 1024 indices and is a four-way set associative cache, then the Bloom filter for the hit prediction table 230 would match this with 1024 indices in the Bloom filter table with each index containing a Bloom filter predicting matches for the four entries contained in the four-way set associative cache at this index. In some implementations, the Bloom filter table can have a different number of indices as the cache 202. For example, the Bloom filter can have twice the number of indices as the cache 202, and for a given index in the cache 202, hit prediction could be performed by one of the two indexes in the Bloom filter table.

A Bloom filter is a probabilistic data structure that is used to test whether an element is a member of a set. It can tell with certainty if an element is not in the set, or it can tell that an element might be in the set. With Bloom filters, false positive matches are possible, but false negatives are not—in other words, a lookup might return that an item is in the set when it is not, but it will never say that an item is not in the set when it is.

Each time a data item is stored in the cache 202, a representation of the data item (such as its tag or a hash thereof) is added to the Bloom filter of the hit prediction table 230. Subsequently, when there's a request to access a data item, the Bloom filter of the hit prediction table 230 is queried first. If the Bloom filter of the hit prediction table 230 indicates that the item is not in the cache 202 (e.g., a definite "no" answer), there is no need to access the cache 20, and thus, the latency of the memory access if reduced. If the Bloom filter of the hit prediction table 230 indicates that the item might be in the cache 202, the cache 202 is then accessed to see if the data item is indeed stored in the cache 202. The result of the access of the cache 202 for the requested data item is then used to update the Bloom filter of the hit prediction table 230, enhancing its ability to predict cache hits in the future.

While the use of a hit prediction table 230 can occasionally result in false positives (indicating a cache hit when it's actually a miss), it also reduces the cache access times and increases the overall system performance with minimal area and computing requirements-which is vital in high-speed computing environments.

Although the cache 202 is described using certain functional blocks and a particular number of ways, some implementations include different numbers and/or types of functional blocks and/or ways. For example, the cache 202 can include 8, 16, or another number of ways. Generally, the described implementations can include any functional blocks and/or ways in the cache 202 and/or computing system 100 that enable the operations herein described. Moreover, although some implementations are described using set associativity, some implementations may use different types of associativity and/or different management policies for the cache 202. For example, some implementations use skewed associativity, full associativity, etc.

In addition, although the hit prediction table 230 is shown in the cache controller 220, in some implementations, the hit prediction table 230 is located elsewhere in the computing system 100. For example, the hit prediction table 230 can be incorporated into a memory controller (not shown) in the computing system 100. Generally, the hit prediction table 230 can be located anywhere in the computing system 100 where the hit prediction table 230 can perform the operations herein described.

Figure 3A:
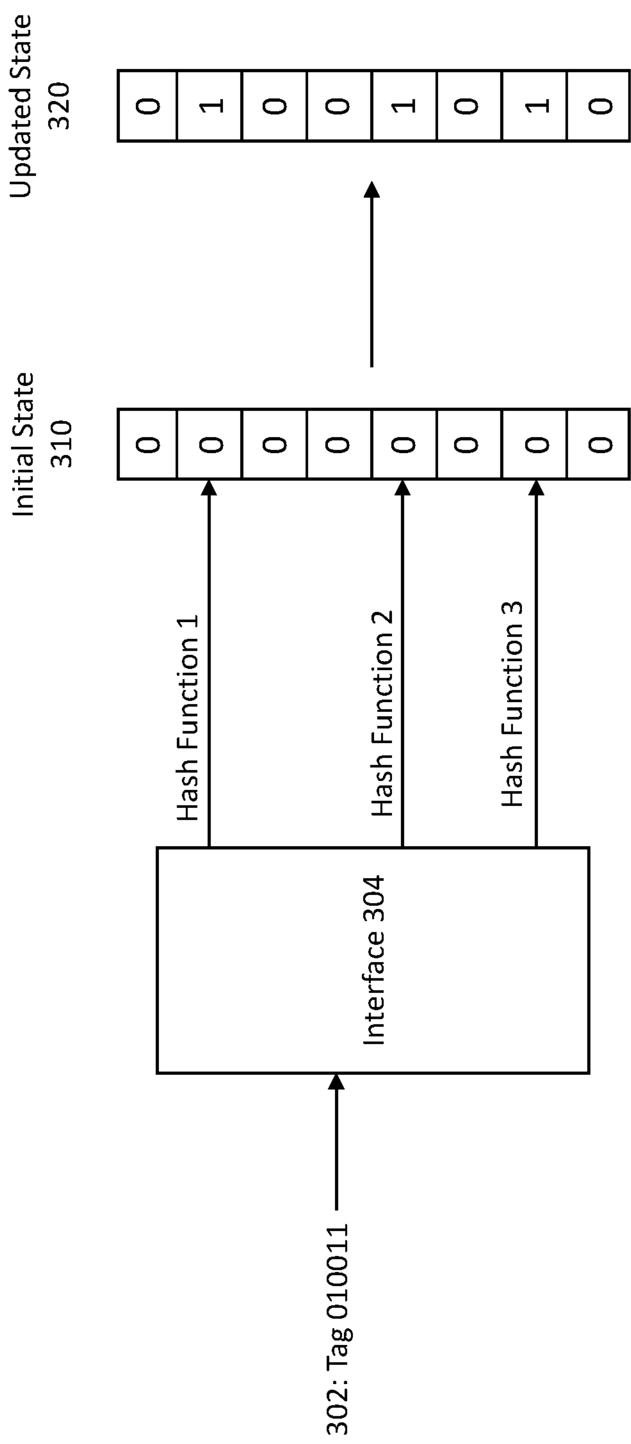
FIGS. 3A and 3B are block diagrams of Bloom filters in accordance with some implementations.
Figure 3B:
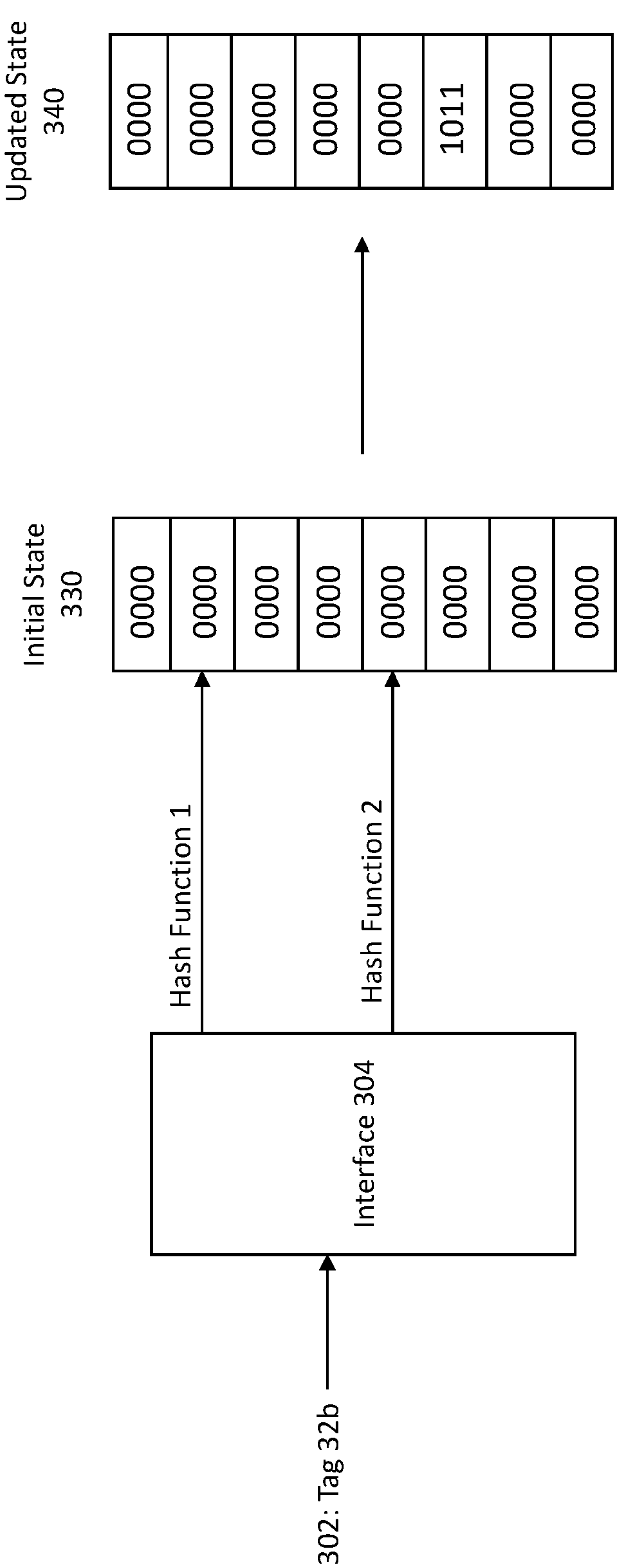

To aid the discussion for the implementation and operation of the hit prediction table 230, an introduction to Bloom filters is now provided. FIGS. 3A and 3B are block diagrams of Bloom filters in accordance with some implementations. FIG. 3A is an implementation with 1-bit values for the entries in the Bloom filter, and FIG. 3B is an implementation with 4-bit values for the entries in the Bloom filter. Generally, a Bloom filter includes an array with a number of entries that are each configured to hold an indicator such as a zero or a one. The Bloom filter also includes (or is associated with) an interface 304 that is configured to: (1) create a record in the Bloom filter of input values that have been received by interface 304, and (2) perform lookups in the Bloom filter to determine if an input value is present in the Bloom filter.

The interface 304 includes circuits that perform one or more operations on a received input value (e.g., combinatorial, mathematical, bit-level, etc.) to generate a corresponding set of indices. For example, in some implementations, the interface 304 includes internal circuits that implement a hash function that generates a set of indices based on a received input value. The interface 304 can use the set of indices to record the receipt of the corresponding input value in Bloom filter or perform a lookup to determine if Bloom filter includes a record indicating that the input value has previously been received.

For the 1-bit entry example in FIG. 3A, the Bloom filter is in an initial state 310, and in an updated state 320 to the right side of the initial state 310. In initial state 310, the Bloom filter has just been created or initialized and thus the entries in the Bloom filter are set to zero. In this state, the Bloom filter holds no record of any input values having been received by the interface 304.

To arrive at updated state 320, an input value 302, Tag value 010011, is received by the interface 304. The interface 304 hashes the input value 302 with three hash functions to produce indices in the second, fifth, and seventh elements of the Bloom filter and updates Bloom filter 300 elements associated with the indices. As shown in FIG. 3A, the update causes the second, fifth, and seventh elements of the Bloom filter to be set to one. After the update, the entries of the Bloom filter indicate (i.e., include a record) that input value 302 was received by the interface 304.

After the update, the interface 304 may receive a lookup query inquiring if input value 302 (Tag value 010011) has been received by the interface 304. The interface 304 can then process the query by hashing the input value 302 with three hash functions to produce indices from input value 302 (which would again be the second, fifth, and seventh elements of the Bloom filter) and checking the corresponding entries in the Bloom filter to determine if the entries were set to one. Here, because the entries are set to one, the interface 304 can send a response to the query indicating that input value 302 may have been received by interface 304.

For the 4-bit entry example in FIG. 3B, the Bloom filter is in an initial state 330, and in an updated state 340 to the right side of the initial state 330. In initial state 330, the Bloom filter has just been created or initialized and thus the entries in the Bloom filter are set to zero. In this state, the Bloom filter holds no record of any input values having been received by the interface 304.

To arrive at updated state 320, an input value 302, for example, an N-bit Tag value, is received by the interface 304. The interface 304 hashes the N-bit input value 302 to one or more M-bit hash values (where N>M). For example, where M=4 (e.g., a 4-bit hash value), the one or more hash values may be '1001' and '0011' and may be inserted into one or more records of the Bloom filter. In the illustrated example of FIG. 3B, both of the hash values are put into the sixth element by OR'ing the hash values into the sixth element of the Bloom filter and updating the sixth element to be '1011'.

Similar to the implementation of FIG. 3A, the interface 304 may receive a lookup query inquiring if input value 302 has been received by the interface 304. The interface 304 can then process the query and can send the appropriate response.

Although 1-bit and 4-bit entry value Bloom filters have been described, the disclosed implementations are not limited to those and may include Bloom filters with different numbers of bits for the entry values.

As discussed above, for Bloom filters, false positive responses to queries are permissible, whereas false negative responses to queries are impermissible (i.e., if an input value has been encountered by the interface 304, the interface 304 should respond positively to queries about the input value). Therefore, the advantages of the modified Bloom filter of the hit prediction table 230 of the current disclosure are clear. Because, in a conventional Bloom filter, given sufficient updates such as the one shown in FIG. 3A, it can be imagined that every element of the Bloom filter would be set to one, and hence any input value queried in the filter would appear to have been received by the interface 304 (perhaps even when the input value had not been received). However, the modified Bloom filter disclosed herein prevents this problem of Bloom filters, by enabling the Bloom filter to stay synchronized with the data items in the respective cache memory. This synchronization can use the hardware and circuitry that is utilized to set the indices of the Bloom filter when input values are insert into the Bloom filter. Further, these updates can be performed efficiently at the times when the cache controller already is accessing the tag values of the respective set of the cache. At these times, the interface of the Bloom filter generates hashes of the tag values and inserts the hash values into the Bloom filter of the hit prediction table 230. Accordingly, the updating of the Bloom filter of the hit prediction table 230 occurs simultaneously with the accessing of the tags of the cache memory.

Figure 4:
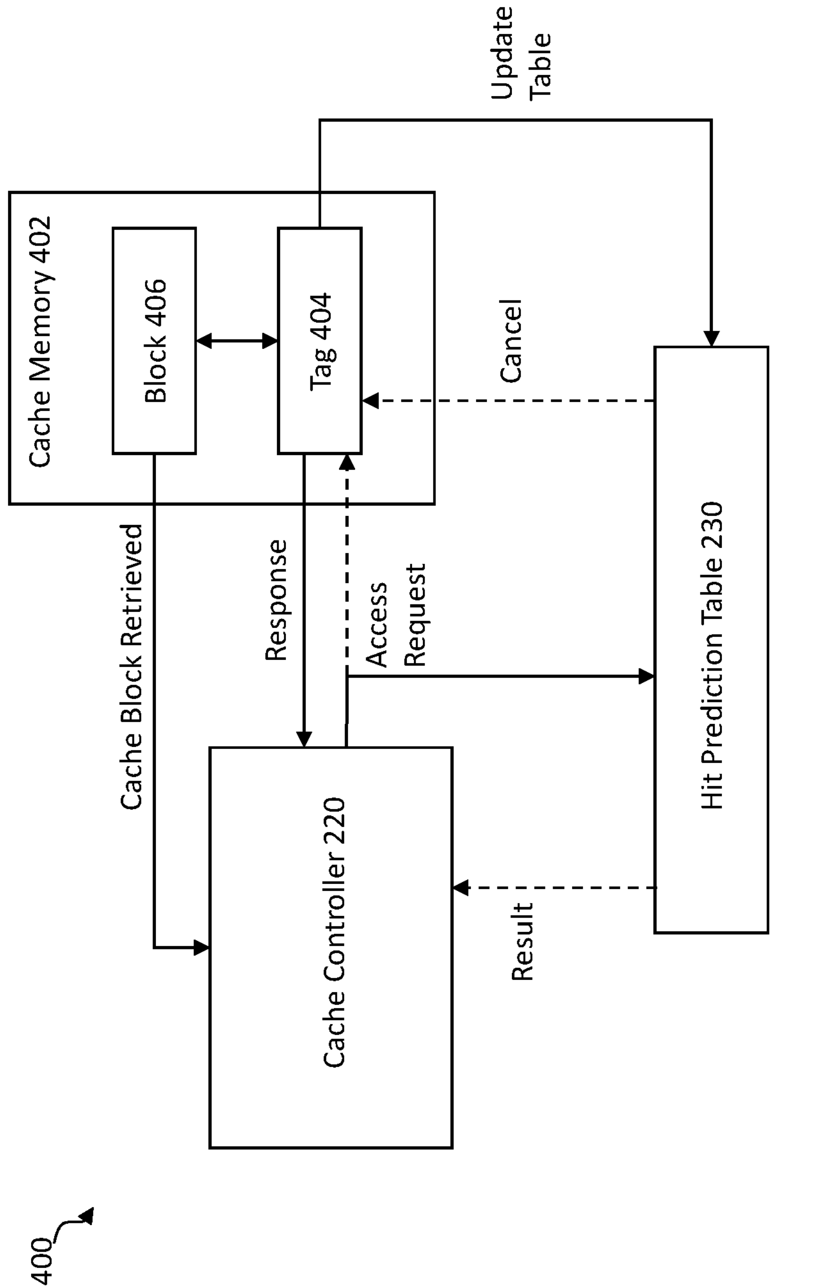
FIG. 4 is a block diagram illustrating the operation of a cache apparatus with a hit prediction table in accordance with some implementations.

FIG. 4 is a block diagram illustrating the operation of a cache apparatus 400 with a hit prediction table in accordance with some implementations. The functional blocks of the cache apparatus 400 include cache memory 402, the cache controller 220, and the hit prediction table 230.

The cache memory 402 includes a tag array 404 and a cache block array 406. The tag array 404 may hold one or more tags 212 as described above. The cache block array 406 may hold one or more cache blocks 214 as described above. Each of the tags 212 in the tag array 404 is associated with a cache block 214 in the cache block array 406. The cache memory 402 may include memory circuits that are divided into a set of cache lines with each cache line configured to store a cache block and a tag. Each cache line can also include other information about the cache block (indicators, flags, set index, etc.).

In some implementations, the cache apparatus 400 is configured as a set associative cache. The operation described in FIGS. 4 and 5 will assume a set associative configuration unless otherwise stated.

When an access request is received by the cache controller 220, the access request will specify an address that includes a tag and a set index that specifies which set is to be accessed. The cache controller 220 sends this access request to the hit prediction table 230 with the tag and set information. In some implementations, the cache controller also sends the access request to the cache memory in parallel with sending it to the hit prediction table 230.

Upon receiving the access request, the hit prediction table 230 performs a lookup in the Bloom filter using the received tag. Remember, with Bloom filters, false positive matches are possible, but false negatives are not. Thus, if the lookup in the Bloom filter results in a miss, the hit prediction table 230 knows with certainty that the requested item with that tag address is not in the cache memory 402. At that point, the hit prediction table 230 sends a result to the cache controller 220 that the requested item is not in the cache memory 402 and the access request can be sent to the next level in the memory hierarchy. In addition, if the access request was sent to the cache memory in parallel, the hit prediction table 230 can send a cancel command to the cache memory 402 to stop the requested lookup. By having the capability of starting the lookup in both the hit prediction table and cache memory at the same time, the latency of the cache apparatus is reduced. Further, the ability to quickly cancel a memory request based on the much faster Bloom filter lookup can minimize the power used in this reduced latency configuration.

If the lookup in the Bloom filter results in a hit, then the requested item with that tag address may be in the cache memory 402. The hit prediction table 230 can then send a result to the cache controller 220 that the requested item could be in the cache memory 402. If the access request was not already sent to the cache memory 402, the cache controller 220 will send that request to the cache memory 402. If the access request results in a hit in the tag array 404 of the cache memory 402 for the requested item, the tag array 404 can provide a "hit" response to the cache controller 220, and then the requested cache block can be retrieved by the cache controller 220. If the access request results in a miss in the tag array 404 of the cache memory 402 for the requested item, the tag array 404 can provide the "miss" response to the cache controller 220, and the access request can be sent to the next level in the memory hierarchy.

During the lookup of the requested tag in the tag array 404, the tags of all of the ways in the set will be loaded into memory and compared against the requested tag. While all of the tags of the ways in the set are loaded in memory, the cache memory 402 sends those tags to the hit prediction table 230 to have the Bloom filter table updated with the tags in the requested set. The hit prediction table 230 will hash the received tags and set the indices as discussed above to update the Bloom filter of the hit prediction table 230.

Even in the scenario where the hit prediction table 230 sends the early "miss" result to the cache controller 220, the access request to the cache memory 402 does not have to be canceled and the hit prediction table 230 can be updated with the tags of the set that was unsuccessfully matched to the requested tag. Thus, even if the access request fails at the current cache level, the lookup of the tags is not wasted as that information is used to maintain the accuracy of the data in the hit prediction table 230.

In some scenarios, the access request can result in the removal of a cache line. In these scenarios, the cache memory 402 can send the remaining tags in that set to the hit prediction table 230 to have the Bloom filter table updated. In some scenarios, the access request can result in the insertion of new line in the cache. In these scenarios, the cache memory 402 can send the tags-including the tag for the new line—to the hit prediction table 230 to have the Bloom filter table updated. If an insertion into the cache memory occurs independently of an access request or lookup of the tag array, the accuracy of the hit prediction table 230 will decline temporarily, but the accuracy will be restored at the next lookup of that set as the hit prediction table 230 will be updated then.

Figure 5:
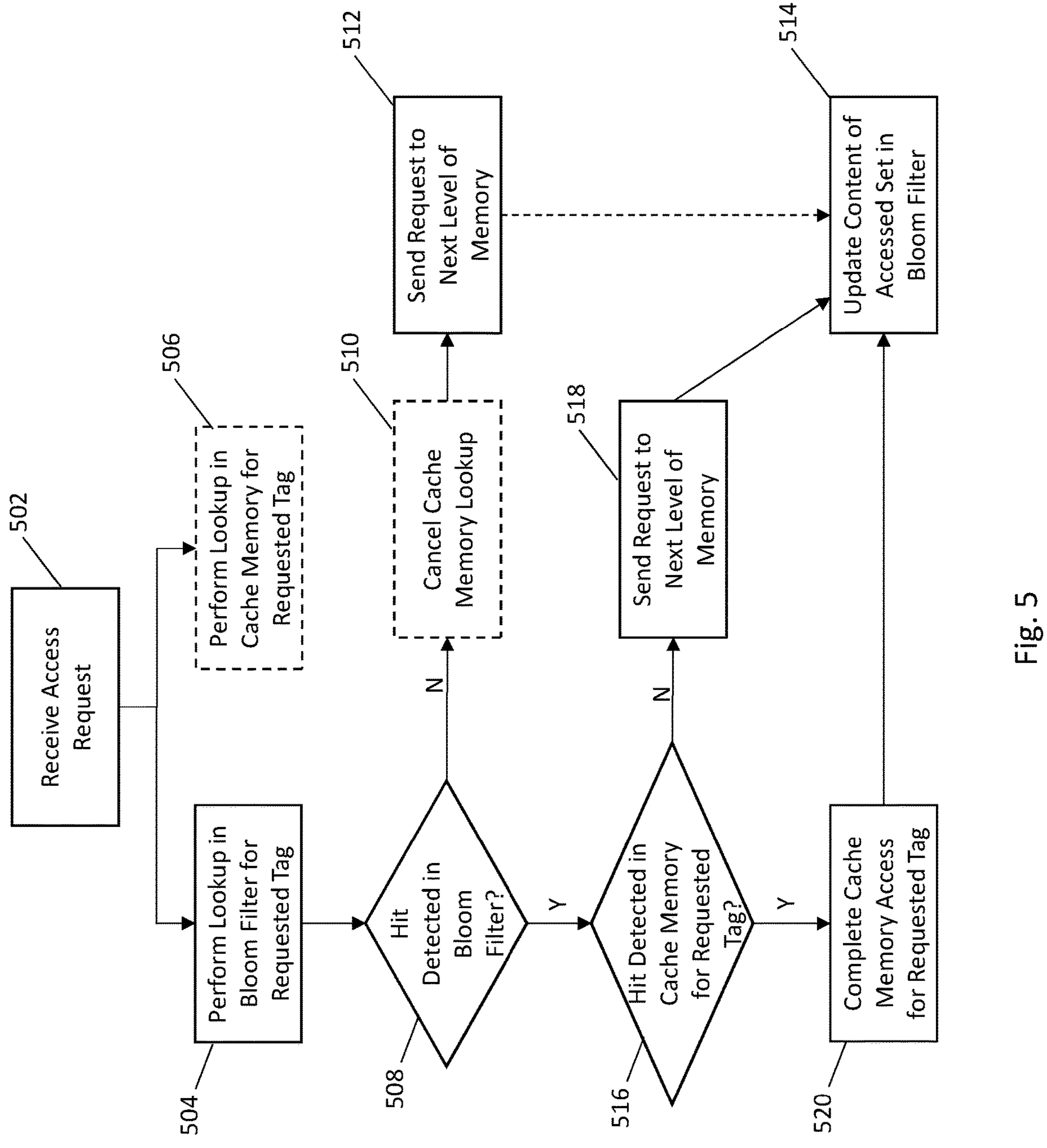
FIG. 5 is a flowchart of the operation of a cache apparatus in accordance with some implementations.

FIG. 5 is a flowchart of the operation of a cache apparatus in accordance with some implementations. At step 502, an access request is received at the cache apparatus. This access request will include an address having a tag and a set index. At step 504, the access request will be sent to the Bloom filter of the hit prediction table 230 (see, e.g., FIGS. 2 and 4). The Bloom filter will perform a lookup of the requested tag as described above. At optional step 506, the access request is sent in parallel to the cache memory to perform a lookup of the requested tag in the requested set. Because the Bloom filter lookup with complete in a fraction of the time required for the cache memory lookup, the Bloom filter will have a hit or miss result well before the cache memory lookup is complete. Thus, to reduce the latency of the cache memory, it may be desirable to start the Bloom filter and the cache memory lookups in parallel.

At step 508, the Bloom filter of the hit prediction table 230 determines whether a hit for the requested tag was detected in the Bloom filter. If the lookup in the Bloom filter results in a miss, at optional step 510, the lookup of the cache memory is canceled as the Bloom filter miss result indicates with certainty that the requested item with that tag is not in the cache memory. If the cache memory lookup was not performed in parallel with the Bloom filter lookup, then step 510 is not applicable. At step 512, based on the Bloom filter miss result, the access request can be sent to the next level in the memory hierarchy. In the scenario where step 506 was performed (parallel cache memory lookup) and it was not canceled in step 510, at step 514, the Bloom filter of the hit prediction table 230 can be updated with the tags of the set in the cache memory that were not a match for the requested tag.

If the lookup in the Bloom filter results in a hit, then an item with the requested tag may be in the cache memory. If step 506 was not performed earlier in parallel with step 504, the lookup in the cache memory of step 504 is now performed.

At step 516, the cache memory determines whether a hit was detected for the requested tag in the cache memory. If the lookup in the cache memory results in a miss, at step 518, the access request can be sent to the next level in the memory hierarchy as the item is not in the current cache memory. At step 514, the Bloom filter of the hit prediction table 230 can be updated with the tags of the set in the cache memory that were not a match for the requested tag.

If the lookup in the cache memory results in a hit that the cache memory contains the requested item, at step 520, the access request for the requested item having the requested tag is completed. At step 514, the Bloom filter of the hit prediction table 230 can be updated with the tags of the set in the cache memory that were accessed.

Although many of the implementations have been described in the context of a cache memory of a computing system, the present disclosure is not limited to these contexts. For example, the present GPU cache, hard drives, or any set associative storage structure.

Throughout the description, the term "functional blocks" has been used to depict some implementations. Typically, these functional blocks comprise one or more (often interconnected) circuits performing the described operations. In certain cases, the circuits within a functional block include circuits that execute program instructions (e.g., machine code, firmware, etc.) to carry out the described operations.

In some implementations, a computing system or device (for instance, the computing system 100 illustrated in FIG. 1) employs program instructions and/or data retrieved from a computer-readable storage medium to conduct a range of operations as described herein. More specifically, the device accesses and executes the program instructions and/or uses the data from the storage medium during the performance of the aforementioned operations.

A computer-readable storage medium can embody any device or set of devices or mediums capable of storing program instructions and/or data that a computational apparatus can use. The storage medium could involve various memory types, including volatile or non-volatile forms like flash memory, diverse types of random-access memory (e.g., eDRAM, RAM, SRAM, DRAM, DDR, DDR2/DDR3/DDR4 SDRAM), read-only memory (ROM), magnetic or optical storage mediums (e.g., disk drives, magnetic tapes, CDs, DVDs). In the described implementations, the computer-readable storage medium does not include non-statutory computer-readable storage mediums such as transitory signals.

In some implementations, a number of hardware modules are designed to perform the operations mentioned here. Such hardware modules can include but are not limited to various processors or processor cores, central processing units (CPUs), application-specific integrated circuit (ASIC) chips, field-programmable gate arrays (FPGAs), cache or cache controllers, embedded processors, graphics processors (GPUs) or graphics processor cores, pipelines, or other programmable-logic devices. In certain cases, these hardware modules include general-purpose circuits configured to execute instructions (such as program code or firmware) to perform the operations.

In some implementations, some or all of the structures and systems described herein may be implemented, at least in part, using a computing device coupled to a non-transitory computer-readable medium, such as a memory. The non-transitory computer-readable medium may include instructions executable by the computing device to implement embodiment algorithms.

An implementation is a method for operating a cache memory in a computing system, receiving a request for a first data item from the cache memory of the computing system, the first data item having an associated tag value. The method also includes performing a lookup in a bloom filter for the tag value associated with the first data item. The method also includes performing a lookup in the cache memory for the requested first data item based on the lookup in the bloom filter. The method also includes updating the bloom filter based on results of the lookup in the cache memory for the requested first data item.

Implementations may include one or more of the following features. The method where performing the lookup in the bloom filter for the tag value associated with the first data item includes computing indices for the bloom filter based on the tag value associated with the first data item. Computing one or more indices for the bloom filter based on the tag value associated with the first data item includes performing one or more hash functions on the tag value associated with the first data item. The cache memory includes a set associative structure with a plurality of cache ways and a plurality of sets, each set includes a cache block from each way. Performing the lookup in the cache memory for the requested first data item based on the lookup in the bloom filter includes retrieving tag values associated with cache blocks in a set index of the plurality of sets for the requested first data item, and comparing the retrieved tag values with the tag value associated with the first data item. Updating the bloom filter based on results of the lookup in the cache memory for the requested first data item includes computing indices for the bloom filter for each retrieved tag value in the set index of the cache memory, and setting each of the computed indices of the bloom filter to a value of one. The method further including removing a cache block from a first set index in the cache memory, computing indices for the bloom filter for tag values of each remaining cache block in the first set index of the cache memory, and setting each of the computed indices of the bloom filter to a value of one. Performing the lookup in the cache memory for the requested first data item based on the lookup in the bloom filter further includes canceling the lookup in the cache memory for the requested first data item when the lookup in the bloom filter for the tag value associated with the first data item results in a miss. After canceling the lookup in the cache memory for the requested first data item, performing a lookup in a different level of cache memory for the requested first data item.

An implementation is an apparatus for operating a cache memory, a cache controller in the cache memory, the cache memory including a set associative structure with a plurality of cache ways and a plurality of sets, each set includes a cache block from each way. The apparatus also includes a hit prediction table in the cache memory, the hit prediction table including a bloom filter, the hit prediction table being configured to perform a lookup in the bloom filter for a tag value associated with a first data item requested from the cache memory, and update the bloom filter with results of a lookup in the cache memory for the requested first data item.

Implementations may include one or more of the following features. The apparatus where to perform the lookup in the bloom filter for the tag value associated with the first data item, the hit prediction table is further configured to compute indices for the bloom filter based on the tag value associated with the first data item. The cache controller is configured to perform a lookup in the cache memory for the requested first data item based on the lookup in the hit prediction table. The cache controller is configured to cancel the lookup in the cache memory for the requested first data item when the lookup in the hit prediction table for the tag value associated with the first data item results in a miss. The cache controller is further configured to retrieve tag values associated with cache blocks in a set index of the plurality of sets for the requested first data item, and compare the retrieved tag values with the tag value associated with the first data item. The Bloom filter has a different number of indexes than the cache memory.

An implementation is a non-transitory computer-readable storage device storing instructions that, when executed by a computing system, cause the computing system to perform a method for operating a cache memory, receiving a request for a first data item from the cache memory of the computing system, the first data item having an associated tag value. The non-transitory computer-readable storage device storing instructions also includes performing a lookup in a bloom filter for the tag value associated with the first data item. The instructions also includes performing a lookup in the cache memory for the requested first data item based on the lookup in the bloom filter. The instructions also includes updating the bloom filter based on results of the lookup in the cache memory for the requested first data item.

Implementations may include one or more of the following features. The non-transitory computer-readable storage device storing instructions that cause the computing system to perform the method for operating the cache memory, the method further including computing indices for the bloom filter based on the tag value associated with the first data item. The cache memory includes a set associative structure with a plurality of cache ways and a plurality of sets, each set includes a cache block from each way. The non-transitory computer-readable storage device storing instructions that cause the computing system to perform the method for operating the cache memory, the method further including retrieving tag values associated with cache blocks in the set index of the plurality of sets for the requested first data item, and comparing the retrieved tag values with the tag value associated with the first data item. The non-transitory computer-readable storage device further including instructions that cause the computing system to perform the method for operating a cache memory, the method further including computing indices for the bloom filter for each retrieved tag value in the set index of the cache memory, and setting each of the computed indices of the bloom filter to a value of one.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular implementations described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding implementations described herein. Accordingly, the appended claims are intended to include within their scope such processes, machines, manufacture, compositions of matter, means, methods, or steps.

What is claimed is:

1. A method for operating a cache memory in a computing system, the method comprising:
   - receiving a request for a first data item from the cache memory of the computing system, the first data item having an associated tag value;
   - performing a lookup in a Bloom filter for the tag value associated with the first data item;
   - performing a lookup in the cache memory for the requested first data item based on the lookup in the Bloom filter; and
   - updating the Bloom filter based on results of the lookup in the cache memory for the requested first data item, wherein updating the Bloom filter comprises sending multiple tag values from a plurality of cache ways in a set index accessed during the lookup to the Bloom filter.

2. The method of claim 1, wherein performing the lookup in the Bloom filter for the tag value associated with the first data item comprises:
   - computing indices for the Bloom filter based on the tag value associated with the first data item.

3. The method of claim 2, wherein computing one or more indices for the Bloom filter based on the tag value associated with the first data item comprises:
   - performing one or more hash functions on the tag value associated with the first data item.

4. The method of claim 1, wherein the cache memory comprises a set associative structure with the plurality of cache ways and a plurality of sets, each set comprises a cache block from each way.

5. The method of claim 4, wherein performing the lookup in the cache memory for the requested first data item based on the lookup in the Bloom filter comprises:
   - retrieving tag values associated with cache blocks in the set index of the plurality of sets for the requested first data item; and
   - comparing the retrieved tag values with the tag value associated with the first data item.

6. The method of claim 5, wherein updating the Bloom filter based on results of the lookup in the cache memory for the requested first data item comprises:
   - computing indices for the Bloom filter for each retrieved tag value in the set index of the cache memory; and
   - setting each of the computed indices of the Bloom filter to a value of one.

7. The method of claim 4, further comprising:
   - removing a cache block from a first set index in the cache memory; and
   - computing indices for the Bloom filter for tag values of each remaining cache block in the first set index of the cache memory; and
   - setting each of the computed indices of the Bloom filter to a value of one.

8. The method of claim 1, wherein performing the lookup in the cache memory for the requested first data item based on the lookup in the Bloom filter further comprises:
   - canceling the lookup in the cache memory for the requested first data item when the lookup in the Bloom filter for the tag value associated with the first data item results in a miss.

9. The method of claim 8, wherein after canceling the lookup in the cache memory for the requested first data item, performing a lookup in a different level of the cache memory for the requested first data item.

10. An apparatus for operating a cache memory, the apparatus comprising:
   - a cache controller in the cache memory, the cache memory comprising a set associative structure with a plurality of cache ways and a plurality of sets, each set comprises a cache block from each way;
   - a hit prediction table in the cache memory, the hit prediction table comprising a Bloom filter, the hit prediction table being configured to:
     - perform a lookup in the Bloom filter for a tag value associated with a first data item requested from the cache memory; and
     - update the Bloom filter with results of a lookup in the cache memory for the requested first data item, wherein updating the Bloom filter comprises, during the lookup in the cache memory for the requested first data item, sending tag values from all the cache ways in a set index for the requested first data item to the Bloom filter.

11. The apparatus of claim 10, wherein to perform the lookup in the Bloom filter for the tag value associated with the first data item, the hit prediction table is further configured to:
   - compute indices for the Bloom filter based on the tag value associated with the first data item.

12. The apparatus of claim 10, wherein the cache controller is configured to:
   - perform the lookup in the cache memory for the requested first data item based on the lookup in the hit prediction table.

13. The apparatus of claim 12, wherein the cache controller is configured to:
   - cancel the lookup in the cache memory for the requested first data item when the lookup in the hit prediction table for the tag value associated with the first data item results in a miss.

14. The apparatus of claim 12, wherein the cache controller is further configured to:
   - retrieve tag values associated with cache blocks in the set index of the plurality of sets for the requested first data item;
   - compare the retrieved tag values with the tag value associated with the first data item;
   - computing indices for the Bloom filter for results of the lookup in the cache memory; and
   - setting each of the computed indices of the Bloom filter to a value of one.

15. The apparatus of claim 14, wherein the Bloom filter has a different number of indexes than the cache memory.

16. A non-transitory computer-readable storage device storing instructions that, when executed by a computing system, cause the computing system to perform a method for operating a cache memory, the method comprising:

receiving a request for a first data item from the cache memory of the computing system, the first data item having an associated tag value;

performing a lookup in a Bloom filter for the tag value associated with the first data item;

performing a lookup in the cache memory for the requested first data item based on the lookup in the Bloom filter; and updating the Bloom filter based on results of the lookup in the cache memory for the requested first data item, wherein updating the Bloom filter comprises, during the lookup in the cache memory for the requested first data item, sending tag values from all cache ways in a set index for the requested first data item to the Bloom filter.

17. The non-transitory computer-readable storage device of claim 16, further comprising instructions that cause the computing system to perform the method for operating the cache memory, the method further comprising:

computing indices for the Bloom filter based on the tag value associated with the first data item.

18. The non-transitory computer-readable storage device of claim 16, wherein the cache memory comprises a set associative structure with a plurality of cache ways and a plurality of sets, each set comprises a cache block from each way.

19. The non-transitory computer-readable storage device of claim 18, further comprising instructions that cause the computing system to perform the method for operating the cache memory, the method further comprising:

retrieving tag values associated with cache blocks in the set index of the plurality of sets for the requested first data item; and comparing the retrieved tag values with the tag value associated with the first data item.

20. The non-transitory computer-readable storage device of claim 19, wherein when the lookup in the cache memory results in removal of a cache line from the cache memory, updating the Bloom filter comprises:

sending tag values of remaining cache blocks in the set index to the Bloom filter; and computing indices for the Bloom filter for the tag values of the remaining cache blocks.

* * * * *